United States Patent
Mabu (10) Patent No.: US 9,819,251 B2
(45) Date of Patent: Nov. 14, 2017

(54) RESIN SEALING METHOD OF MOTOR CORE

(71) Applicant: MITSUI HIGH-TEC, INC., Kitakyushu-shi, Fukuoka (JP)

(72) Inventor: Hirotoshi Mabu, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 195 days.

(21) Appl. No.: 14/818,595

(22) Filed: Aug. 5, 2015

(65) Prior Publication Data

US 2016/0056694 A1 Feb. 25, 2016

(30) Foreign Application Priority Data

Aug. 19, 2014 (JP) ................. 2014-166679

(51) Int. Cl.
*H02K 15/02* (2006.01)
*H02K 15/10* (2006.01)
*H02K 15/12* (2006.01)

(52) U.S. Cl.
CPC ........ *H02K 15/12* (2013.01); *Y10T 29/49009* (2015.01); *Y10T 29/49012* (2015.01)

(58) Field of Classification Search
CPC .......... H02K 5/08; H02K 15/03; H02K 15/02; H02K 1/27; Y10T 29/49009; Y10T 29/49012
USPC ............................ 29/598, 596, 607, 609, 732
See application file for complete search history.

(56) References Cited

U.S. PATENT DOCUMENTS

| 7,649,298 B2 * | 1/2010 | Enomoto ............... H02K 1/145 310/257 |
| 2003/0151327 A1 | 8/2003 | Ramirez |
| 2009/0189309 A1 | 7/2009 | Matsubayashi et al. |
| 2011/0115126 A1 | 5/2011 | Matsubayashi et al. |
| 2012/0235531 A1 * | 9/2012 | Fukasaku ............... H02K 15/12 310/156.23 |
| 2012/0305180 A1 | 12/2012 | Matsubayashi et al. |
| 2014/0151926 A1 | 6/2014 | Matsubayashi et al. |

FOREIGN PATENT DOCUMENTS

| JP | 2003-529309 | 9/2003 |
| JP | 3786946 | 3/2006 |

\* cited by examiner

*Primary Examiner* — Thiem Phan
(74) *Attorney, Agent, or Firm* — Greenblum & Bernstein, P.L.C.

(57) ABSTRACT

Provided is a resin sealing method of a motor core having a rotor core and a stator core formed in such a way that a plurality of iron core pieces is laminated. The resin sealing method includes pressing the rotor core and the stator core from a direction of lamination by using a set of an upper die and a lower die, then extruding a resin stored in a resin reservoir pot provided in one or both of the upper die and the lower die by using a plunger and allowing a magnet-insert hole formed in the direction of lamination of the rotor core and a connection hole formed in the direction of lamination of the stator core to be filled with the resin and harden the resin.

8 Claims, 5 Drawing Sheets

RESIN SEALING METHOD OF MOTOR CORE

CROSS REFERENCE TO RELATED APPLICATION(S)

This application is based upon and claims the benefit of priority of Japanese Patent Application No. 2014-166679 filed on Aug. 19, 2014, the contents of which are incorporated herein by reference in its entirety.

BACKGROUND OF THE INVENTION

1. Field of the Invention

The present invention relates to a resin sealing method of a motor core formed by laminating a plurality of iron core pieces and an apparatus used for the resin sealing method of a motor core.

2. Description of the Related Art

The motor core includes a rotor core (a rotor laminated iron core) and a stator core (a stator laminated iron core) formed by laminating a plurality of iron core pieces.

For instance, as disclosed in Japanese Patent No. 3786946 as Patent Literature 1, in the rotor core, a magnet-insert hole is formed in a direction of lamination thereof. A permanent magnet is inserted into the magnet-insert hole. The magnet insert-hole is filled with a resin (a resin member) and the resin is hardened to fix the permanent magnet to the magnet-insert hole.

Further, for instance, as disclosed in JP-T-2003-529309 as Patent Literature 2, in the stator core, a connection hole (a housing) is formed which passes through in a direction of lamination thereof. The connection hole is filled with a resin (an insert material) to harden the resin, so that iron core pieces (thin metal sheets) adjacent in the direction of lamination are connected together and formed integrally.

Patent Literature 1: Japanese Patent No. 3786946
Patent Literature 2: JP-T-2003-529309

SUMMARY OF THE INVENTION

However, in the above-described resin filling operation to the rotor core and the stator core, since different resin filling apparatuses are used in the rotor core and the stator core to separately carry out the filling operations, exclusive apparatuses need to be respectively prepared. Thus, a problem arises that a facility cost is increased and a working efficiency is deteriorated.

The present invention is devised by considering the above-described circumstances and it is a non-limited object of one or more of embodiments of the present invention to provide a resin sealing method of a motor core and an apparatus used for the resin sealing method of the motor core which can reduce a facility cost and improve productivity.

A first aspect of the present invention provides a resin sealing method of a motor core having a rotor core and a stator core formed in such a way that a plurality of iron core pieces is laminated, the resin sealing method including: pressing the rotor core and the stator core from a direction of lamination by using a set of an upper die and a lower die; then extruding a resin stored in a resin reservoir pot provided in one or both of the upper die and the lower die by using a plunger; and allowing a magnet-insert hole formed in the direction of lamination of the rotor core and a connection hole formed in the direction of lamination of the stator core to be filled with the resin and harden the resin.

It is possible to adopt not only a case where the upper die and the lower die (the rotor core and the stator core) are aligned with their axes in a vertical direction, but also a case where the upper die and the lower die (the rotor core and the stator core) are aligned and inclined with respect to the vertical direction.

The resin sealing method of the first aspect may be configured so that when the resin reservoir pot is provided in one of the upper die and the lower die, the plunger is shared to extrude the resin stored in the resin reservoir pot to the magnet-insert hole and the connection hole.

The resin sealing method of the first aspect may be configured so that when the resin reservoir pot includes a rotor-dedicated pot used solely for a rotor and a stator-dedicated pot used solely for a stator and the plunger includes a rotor-dedicated plunger used solely for the rotor which extrudes the resin stored in the rotor-dedicated pot to the magnet-insert hole and a stator-dedicated plunger used solely for the stator which extrudes the resin stored in the stator-dedicated pot to the connection hole, the resin stored in the rotor-dedicated pot and the resin stored in the stator-dedicated pot are respectively extruded individually by using the rotor-dedicated plunger and the stator-dedicated plunger.

The resin sealing method of the first aspect may be configured so that the upper die or the lower die provided with a pressure mitigating unit is allowed to directly come into contact with the rotor core so as to apply a pressing force to the rotor core and the pressure mitigating unit is allowed to come into contact with the stator core so as to apply a pressing force to the stator core.

The resin sealing method of the first aspect may be configured so that the rotor core and the stator core are pressed by using the upper die and the lower die in a state where the rotor core and the stator core are mounted on one jig.

The resin sealing method of the first aspect may be configured so that the upper die or the jig provided with a pressure mitigating unit is allowed to directly come into contact with the rotor core so as to apply a pressing force to the rotor core and the pressure mitigating unit is allowed to come into contact with the stator core so as to apply a pressing force to the stator core.

The resin sealing method of the first aspect may be configured so that the rotor core and the stator core are pressed by different pressures, respectively.

A second aspect of the present invention provides an apparatus used for a resin sealing method of a motor core including a rotor core formed by laminating a plurality of iron core pieces and having a magnet-insert hole formed in a direction of lamination and a stator core having a connection hole formed in a direction of lamination, the apparatus including: a rotor-dedicated positioning unit used solely for a rotor which positions the rotor core and a stator-dedicated positioning unit used solely for a stator which positions the stator core, wherein the apparatus is used in a state where the rotor core and the stator core are positioned and mounted on the apparatus, and during a use of the apparatus, the rotor core and the stator core are pressed from a direction of lamination by a set of an upper die and a lower die, then, a resin stored in a resin reservoir pot provided in one or both of the upper die and the lower die is extruded by using a plunger and the magnet-insert hole and the connection hole are allowed to be filled with the resin so as to harden the resin.

The apparatus of the second aspect may be configured so that the apparatus is a conveying tray with the rotor core and the stator core mounted on to be conveyed.

Since the resin sealing method of the motor core and the apparatus used for the resin sealing method of the motor core according to the aspects of the present invention press (mold clamping) the rotor core and the stator core and the magnet-insert hole of the rotor core and the connection hole of the stator core are filled with the resin by using a set of an upper die and a lower die, resin filling operations of the rotor core and the stator core do not need to be separately carried out as in the usual technique.

Accordingly, the facility cost can be reduced and the productivity can be improved.

Here, when a plunger is shared which pushes out the resin stored in a resin reservoir pot into the magnet-insert hole and the connection hole, the resin filling operation to the magnet-insert hole and the connection hole can be carried out by a simple structure.

Further, when as the resin reservoir pot, a pot used solely for the rotor and a pot used solely for the stator are used and, as the plunger, a plunger used solely for the rotor and a plunger used solely for the stator are used to individually extrude the resin to the magnet-insert hole and the connection hole, a filling condition of the resin (for instance, an extrusion pressure or the kind of the resin) can be individually set.

DETAILED DESCRIPTION OF THE EXEMPLARY EMBODIMENTS

By referring to the accompanying drawings, an exemplary embodiment which embodies the present invention will be described to understand the present invention.

Initially, a motor core to which a resin sealing method of a motor core according to one exemplary embodiment of the present invention is applied will be described, and then, the resin sealing method of the motor core will be described below.

Figure 1:
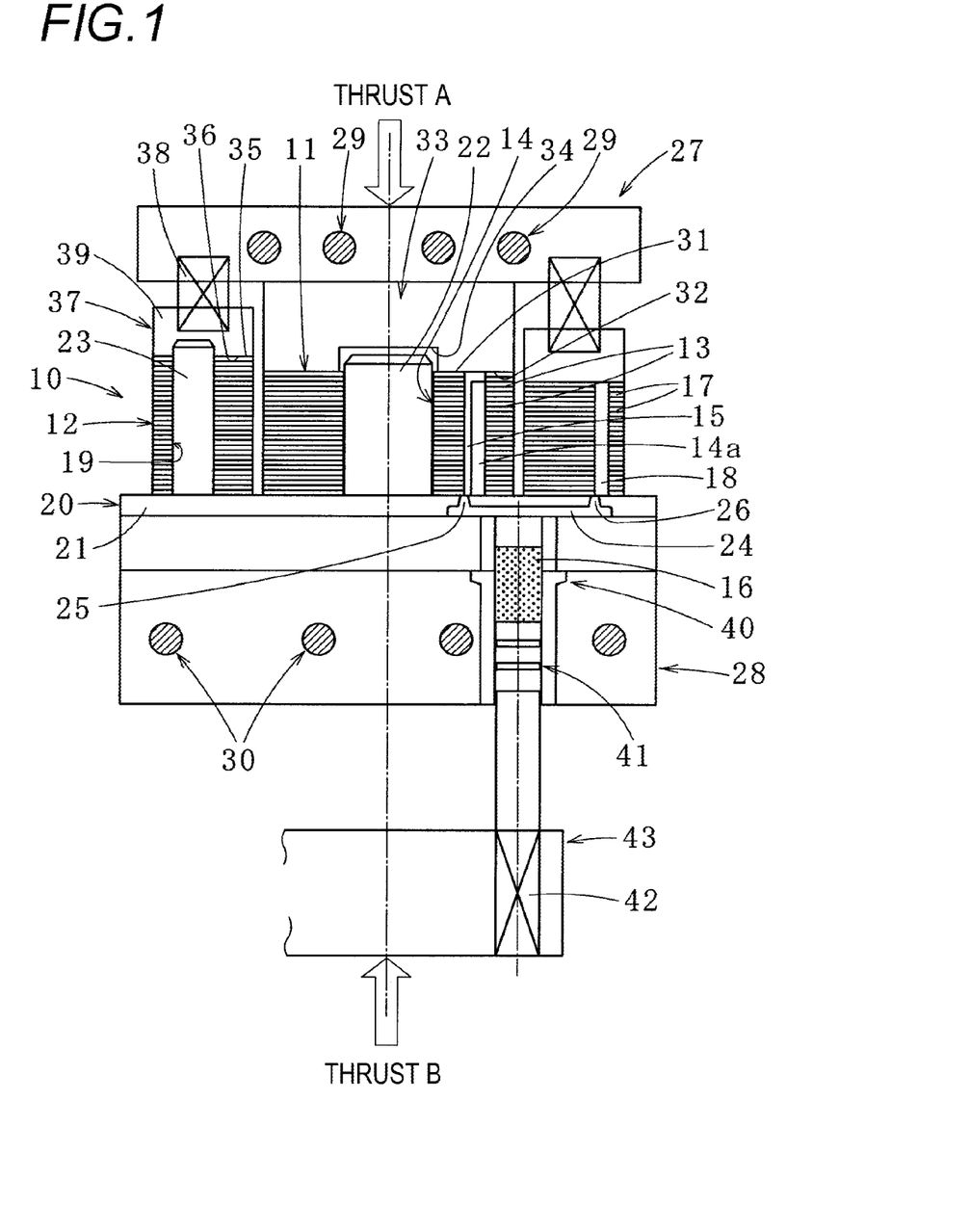
FIG. 1 is an explanatory view of a resin sealing method of a motor core according to a first exemplary embodiment of the present invention.

As shown in FIG. 1, a motor core 10 includes a rotor core (a rotor laminated iron core) 11 and a stator core (a stator laminated iron core) 12. In FIG. 1, a thickness (a height) of the stator core 12 is different between a right part and a left part with respect to a central line as a center. This shows for convenience sake that there are cases in which the thickness of the stator core 12 is larger or smaller than the thickness of the rotor core 11. Actually, the thickness of the rotor core 11 and the thickness of the stator core 12 are substantially the same (the same applies to FIG. 2 to FIG. 5).

The rotor core 11 is formed by sequentially laminating a plurality of annular iron core pieces 13. The annular iron core piece 13 of one layer has a unitary structure having no connection parts in a circumferential direction, but may have a division structure in which circular arc shaped iron core piece parts are connected together in an annular form.

The iron core pieces 13 adjacent in a direction of lamination are connected together by using, for instance, caulking or welding. Alternatively, the iron core pieces 13 may be connected together by filling a connection hole formed with a through hole provided in the direction of lamination with a resin (for instance, an epoxy resin). As for the connection, two kinds or more of any of the caulking, the welding and the resin may be used together.

In a center of the rotor core 11, a shaft hole 14 is formed. In a periphery of the shaft hole 14 as a center, are formed a plurality of magnet-insert holes 15 of permanent magnets 14a which are formed with through holes provided in the direction of lamination of the rotor core 11. In the shaft hole 14, a key (a protrusion) which protrudes inside and is not shown in the drawing is provided.

The permanent magnets 14a inserted into the magnet-insert holes 15 respectively are fixed in the magnet-insert holes 15 by hardening a resin 16 with which the magnet-insert holes 15 are respectively filled. For the resin 16, a thermosetting resin (for instance, the epoxy resin) can be used, or a thermoplastic resin may be used.

The stator core 12 is formed by sequentially laminating a plurality of annular iron core pieces 17. The annular iron core piece 17 of one layer has a unitary structure having no connection parts in a circumferential direction, but may have a division structure in which circular arc shaped iron core piece parts are connected together in an annular form.

The iron core pieces 17 adjacent in a direction of lamination are connected together by filling a connection hole 18 formed with a through hole provided in the direction of lamination of the stator core 12 with the resin 16 (other kind of resin may be used). A plurality of connection holes 18 are formed in a circumferential direction of the stator core 12.

For the above-described connection, a caulking and/or a welding may be further used together.

Further, in the stator core 12, a plurality of slots 19 are formed in the circumferential direction thereof.

Subsequently, the resin sealing method of the motor core according to the one exemplary embodiment of the present invention will be described below by referring to FIG. 1.

Initially, the rotor core 11 and the stator core 12 forming the motor core 10 are manufactured from a thin metal sheet made of an electromagnetic steel plate with a thickness of, for instance, about 0.15 to 0.5 mm by a below-described method.

The rotor core 11 is manufactured in such a way that the plurality of iron core pieces 13 are blanked from the above-described thin metal sheet and a previously set number of the iron core pieces are laminated.

Here, as a method for laminating the plurality of iron core pieces 13, may be used any one or any two or more of the above-described caulking, the welding and the resin. When the resin is used, the connection hole is formed in the direction of lamination of the rotor core.

Then, into the magnet-insert holes 15 of the rotor core 11 respectively, are inserted the unexcited permanent magnets 14a whose cross-sections are smaller than those of the magnet-insert holes 15. Into the magnet-inset holes 15 respectively, the excited permanent magnets may be inserted.

Further, the stator core 12 is manufactured in such a way that the plurality of iron core pieces 17 are blanked from the above-described thin metal sheet and a previously set number of the iron core pieces are laminated.

Here, for the connection of the plurality of laminated iron core pieces 17, since the resin 16 is used, the connection holes 18 of the through holes are formed in the direction of lamination of the stator core 12 as described above. For the connection, not only the above-described resin 16, but also the caulking and/or the welding may be used together.

Then, the rotor core 11 and the stator core 12, namely the motor core 10 are mounted on one metallic conveying tray (one example of an apparatus which is also referred to as a jig) 20.

The conveying tray (a core set plate) 20 has a base plate 21 to mount the rotor core 11 and the stator core 12 on the base plate 21 with their axes aligned and convey them. In the rotor core 11, a post (one example of a rotor-dedicated positioning unit used solely for the rotor) 22 which is allowed to stand upright in a center of the base plate 21 is inserted (fitted) to the shaft hole 14. Further, in the stator core 12, to the slots 19 thereof, a plurality of blocks (one examples of stator-dedicated positioning units solely used for the stator) 23 which are allowed to stand upright in a peripheral part of the base plate 21 are inserted (fitted).

Here, in the post 22 of the conveying tray 20, since a key groove corresponding to the key of the shaft hole 14 is provided, the rotor core 11 is positioned to the conveying tray 20. Further, since the plurality of blocks 23 of the conveying tray 20 are respectively inserted into the slots 19 formed in the stator core 12, the stator core 12 is positioned to the conveying tray 20.

In order to position the rotor core 11 and the stator core 12, a light-weight hole or the like which is formed in the direction of lamination of the core can be used to reduce the weight of the core without using the above-described shaft hole 14 or the slots 19.

In the base plate 21 of the conveying tray 20, are respectively formed a runner (a resin passage) 24 which is opened toward a lower surface side and two kinds of gates (resin injection holes) 25 and 26 which communicate with the runner 24 and are opened toward an upper surface side. The one gate 25 of the two kinds of gates 25 and 26 is formed in a position overlapped on the magnet-insert hole 15 in plan view. Further, the other gate 26 is formed in a position overlapped on the connection hole 18 in plan view.

Thus, the resin 16 in the runner 24 can be injected to the magnet-insert hole 15 and the connection hole 18 respectively through the gates 25 and 26.

The above-described rotor core 11, the stator core 12 and the conveying tray 20 are previously heated (preheated) to a resin injection temperature (for instance, about 150 to 170° C.) depending on kinds of the resin to be used. A heating method is not especially limited. For instance, gas (hot air) or a heater or the like can be used.

Thus, a fluidity of the resin 16 flowing in the conveying tray 20 and the rotor core 11 or the stator core 12 can be maintained, so that a stable injection of the resin 16 can be carried out.

The above-described rotor core 11 and the stator core 12 may be preheated to a temperature lower than that of the conveying tray 20, for instance, 60 to 100° C. Thus, a preheating time of the core can be shortened and productivity can be improved.

Then, in a state where the rotor core 11 and the stator core 12 are mounted on the above-described conveying tray 20, the rotor core 11 and the stator core 12 are held from the direction of lamination by using a set of an upper die (a pressing die) 27 and a lower die (a resin injection die) 28. Thus, the rotor core 11 and the stator core 12 are pressed (clamped) at the same time.

In the upper die 27 and the lower die 28, heaters (heating units) 29 and 30 for heating the rotor core 11 and the stator core 12 sandwiched between them are respectively provided.

In a central part of a lower surface side of the upper die 27, a pressing part 33 used solely for the rotor is provided with its lower surface 32 which abuts on (comes into contact with) an upper surface 31 of the rotor core 11. Thus, a pressing force (a thrust A, the same in the following) can be directly applied to the rotor core 11 from the upper die 27.

In a central part of the lower surface side of the pressing part 33 used solely for the rotor, a recessed part 34 is provided to which an end part of the post 22 can enter. Thus, when the rotor core 11 is pressed, the pressing part 33 solely used for the rotor is prevented from coming into contact with the post 22.

Further, in a peripheral edge part of the lower surface side of the upper die 27, a pressure mitigating unit 37 is provided with its lower surface 36 which abuts on (comes into contact with) an upper surface 35 of the stator core 12. The pressure mitigating unit 37 has a pressing part (a movable plate) 39 used solely for the stator provided in the upper die 27 through a spring (a resilient member) 38. The pressing part 39 solely used for the stator has an annular form corresponding to the form of the stator core 12, however, may have a form divided into a plurality of parts in the circumferential direction (circular arc shapes).

Thus, the pressing force from the upper die 27 can be applied to the stator core 12 through the pressure mitigating unit 37.

As described above, since the pressure mitigating unit 37 is provided in the upper die 27, the pressing force from the upper die 27 can be directly applied to the rotor core 11 and the pressing force from the upper die 27 can be weakened and applied to the stator core 12.

Accordingly, the rotor core 11 and the stator core 12 can be respectively pressed by different pressures. Since the stator core 12 may be pressed by the pressing force smaller than that of the rotor core 11, the above-described pressing operation can be made.

The pressing force is adjusted by the pressure mitigating unit 37 (a selection of the spring 38) in accordance with, for instance, a maximum value and a minimum value of a thickness of lamination of the rotor core 11 and the stator core 12 to be pressed.

In the lower die 28, are provided a resin reservoir pot 40 in which the tablet shaped resin 16 is charged and a plunger 41 which can be lifted and lowered upward and downward in the resin reservoir pot 40. The tablet shaped resin 16 can be heated to be molten in liquid state by the heaters 30 provided in the lower die 28.

The plunger 41 can be lifted and lowered by a pressure (a thrust B) from a plunger unit 43 having a spring 42 which is provided below the lower die 28.

Thus, after the resin 16 in the resin reservoir pot 40 is heated in the resin reservoir pot 40 to be liquid, the resin 16 can be extruded from the resin reservoir pot 40 by the plunger 41.

The extruded liquid resin 16 passes the runner 24 which communicates with an end part in a downstream side of the resin reservoir pot 40 and is formed between an upper surface of the lower die 28 and a lower surface of the conveying tray 20 and is finally injected to the magnet-insert holes 15 and the connection holes 18 respectively through the gates 25 and 26 to fill the magnet-insert holes 15 and the connection holes 18 with the resin.

In such a way, the resin 16 is extruded to the magnet-insert holes 15 and the connection holes 18 by one plunger 41. That is, the plunger 41 is shared.

After the magnet-insert holes 15 are respectively filled with the liquid resin 16 by the above-described method, the resin 16 is hardened to fix the permanent magnets 14a in the magnet-insert holes 15. Further, after the connection holes 18 are respectively filled with the liquid resin 16, the resin 16 is hardened to connect together the iron core pieces 17 adjacent in the direction of lamination.

After the filling operation and the hardening operation of the resin 16 in the rotor core 11 and the stator core 12 are completed by the above-described method, the upper die 27 and the lower die 28 are released, and further, the conveying tray 20 is removed for use. When the rotor core 11 is used, the permanent magnets 14a are magnetized and a shaft is inserted into the shaft hole 14.

When the conveying tray 20 is used in such a way, an unnecessary resin 16 can be removed together with the conveying tray 20 from the rotor core 11 and the stator core 12. Namely, the conveying tray 20 has a function as a cull plate.

Accordingly, by using the resin sealing method of the motor core of the embodiment of the present invention, a facility cost can be reduced and productivity can be improved.

The pressing operation (the mold clamping operation) of the motor core 10 and the filling operation of the resin 16 are not limited to the above-described method, and methods shown in FIG. 2 to FIG. 5 can be used. Now, these methods will be respectively described by referring to FIGS. 2 to 5. The same members as those of FIG. 1 are designated by the same reference numerals and a detailed description thereof are omitted.

Figure 2:
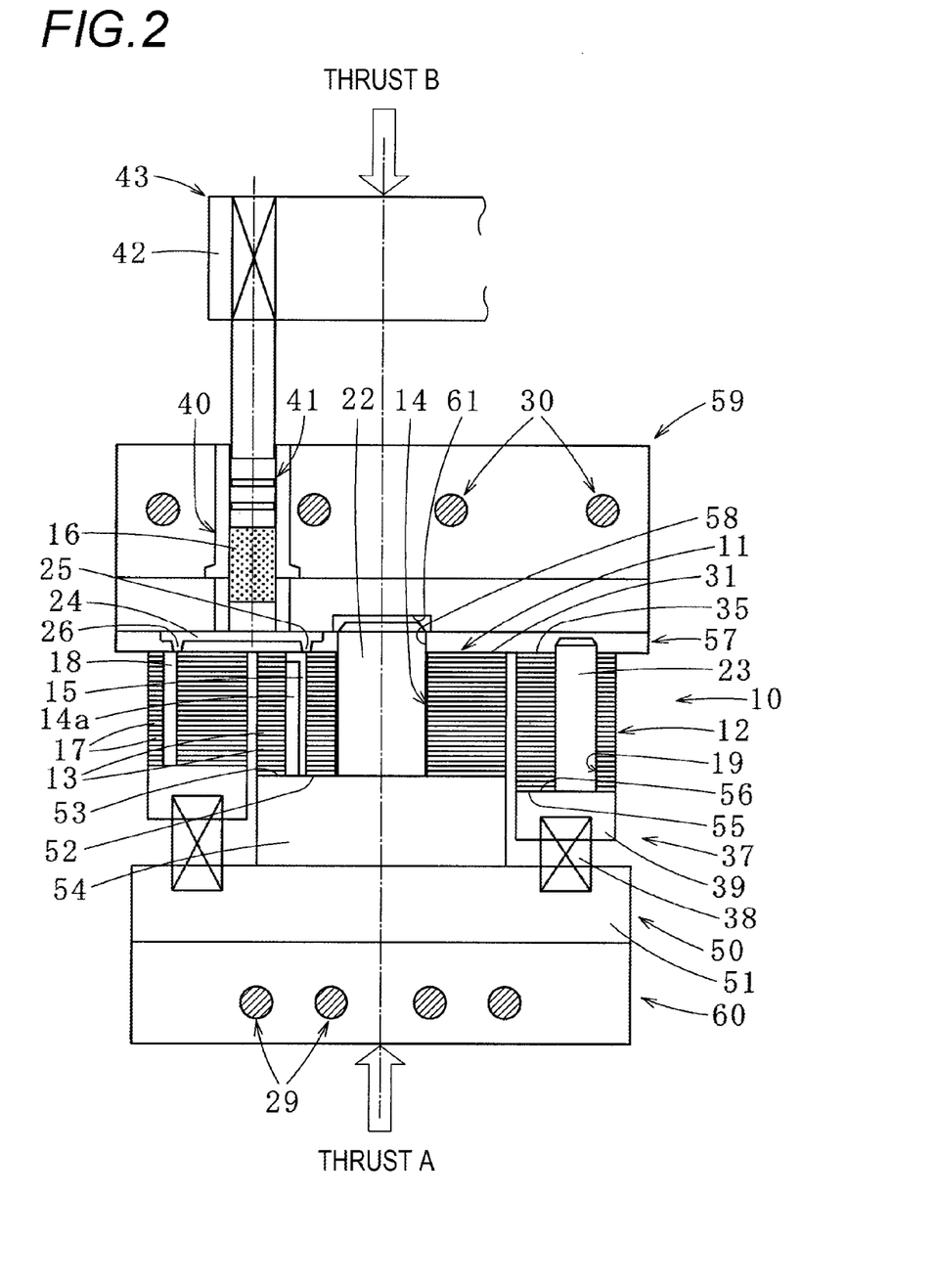
FIG. 2 is an explanatory view of a resin sealing method of a motor core according to a first modified example.

Initially, a method shown in FIG. 2 will be described below.

The above-described rotor core 11 and the stator core 12, namely, the motor core 10 is mounted on one metallic mount base (one example of an apparatus, which is also referred to as a jig) 50.

The mount base 50 has a base plate 51. In a central part of an upper surface side of the base plate 51, a pressing part 54 used solely for the rotor is provided with an upper surface 53 which abuts on (comes into contact with) a lower surface 52 of the rotor core 11. In a peripheral edge part of the upper surface side of the base plate 51, a pressure mitigating unit 37 is provided with its upper surface 56 which abuts on (comes into contact with) a lower surface 55 of the stator core 12.

In a center of the pressing part 54 used solely for the rotor, a post 22 inserted into a shaft hole 14 of the rotor core 11 is allowed to stand upright. Further, in a pressing part 39 used solely for the stator of the pressure mitigating unit 37, a plurality of blocks 23 inserted into slots 19 of the stator core 12 are allowed to stand upright.

Thus, the rotor core 11 and the stator core 12 can be mounted on the base plate 51 with their axes aligned and the rotor core and the stator core can be also positioned.

The rotor core 11, the stator core 12 and the mount base 50 are previously heated like the above-described rotor core 11, the stator core 12 and the conveying tray 20.

Then, a metallic cull plate 57 previously heated (preheated) to a resin injection temperature is arranged on surfaces of the rotor core 11 and the stator core 12 mounted on the mount base 50. At this time, an upper surface 31 of the rotor core 11 and an upper surface 35 of the stator core 12 are located at the same height by the pressure mitigating unit 37.

In the cull plate 57, are respectively formed a runner 24 which is opened toward an upper surface side and two kinds of gates 25 and 26 which communicate with the runner 24 and are opened toward a lower surface side Further, in a central part of the cull late 57, a hole 58 is formed into which the post 22 can be inserted (fitted). Thus, the post 22 of the mount base 50 is inserted (fitted) into the shaft hole 14 of the rotor core 11 and the hole 58 of the cull plate 57 so that the cull plate 57 may be positioned to the rotor core 11 and the stator core 12.

The positioning operation is carried out in such a manner that the gates 25 and 26 of the cull plate 57 respectively correspond to a position of a magnet-insert hole 15 of the rotor core 11 and a position of a connection hole 18 of the stator core 12.

The cull plate 57 is previously heated like the above-described conveying tray 20.

Then, in a state where the rotor core 11 and the stator core 12 are mounted on the above-described mount base 50 and the cull plate 57 is arranged on the surfaces the rotor core and the stator core, the rotor core 11 and the stator core 12 are held from a direction of lamination by using a set of an upper die (a resin injection die) 59 and a lower die (a pressing die) 60. Thus, the rotor core 11 and the stator core 12 are pressed (clamped) at the same time.

The upper die 59 has a structure substantially the same as a structure that the above-described lower die 28 is inverted in a vertical direction. The lower die 60 has a structure substantially the same as a structure that the above-described upper die 27 is inverted in a vertical direction. Specifically, in the upper die 59, a recessed part 61 is provided to which an end part of the post 22 can enter. In the lower die 60, the pressure mitigating unit 37 is not directly provided.

Thus, a pressing force (a thrust A, the same in the following) can be directly applied to the rotor core 11 from the lower die 60 through the mount base 50. Further, the pressing force from the lower die 60 can be applied to the stator core 12 through the pressure mitigating unit 37 provided in the mount base 50.

Then, a resin 16 which is heated in a resin reservoir pot 40 provided in the upper die 59 to become liquid is extruded from the resin reservoir pot 40 by a plunger 41. The extruded liquid resin 16 is finally injected to the magnet-insert hole 15 and the connection hole 18 respectively through the runner 24 and the gates 25 and 26 to fill the magnet-insert hole 15 and the connection hole 18 with the resin. Further, the filled resin 16 is hardened, so that a permanent magnet 14a can be fixed in the magnet-insert hole 15 and iron core pieces 17 adjacent in the direction of lamination can be connected together.

Figure 3:
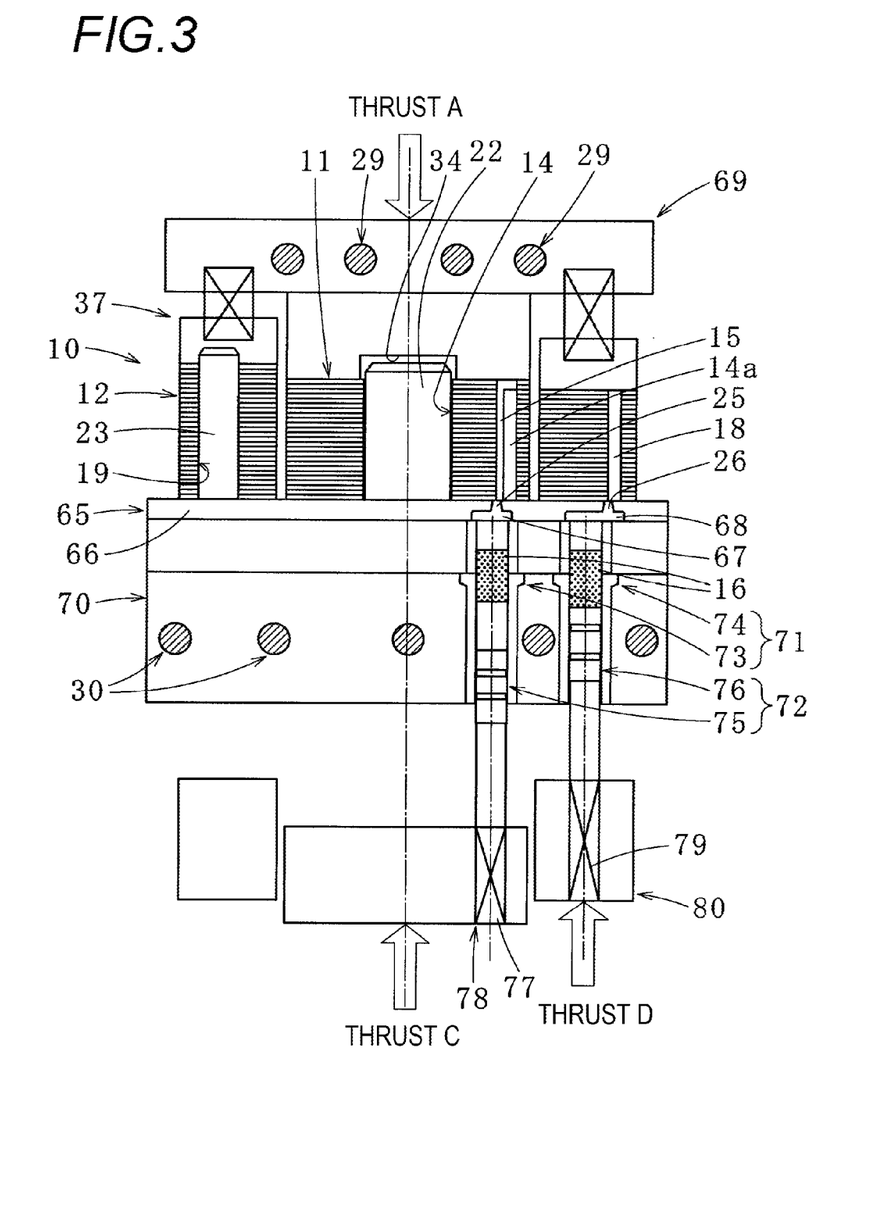
FIG. 3 is an explanatory view of a resin sealing method of a motor core according to a second modified example.

Now, the method shown in FIG. 3 will be described below by referring to FIG. 3.

The above-described rotor core 11 and the stator core 12, namely, the motor core 10 are mounted on one metallic conveying tray (one example of an apparatus which is also referred to as a jig) 65.

The conveying tray 65 has a base plate 66 to mount the rotor core 11 and the stator core 12 on the base plate 66 with their axes aligned.

In the base plate 66 of the conveying tray 65, are respectively formed two kinds of runners (resin passages) 67 and 68 which are opened toward a lower surface side and two kinds of gates (resin injection holes) 25 and 26 which respectively communicate with the runners 67 and 68 and are opened toward an upper surface side.

Thus, a resin 16 in the one runner 67 can be injected to a magnet-insert hole 15 through the gate 25. The resin 16 in the other runner 68 can be injected to a connection hole 18 through the gate 26.

The conveying tray 65 is previously heated together with the rotor core 11 and the stator core 12 like the above-described conveying tray 20.

Then, in a state where the rotor core 11 and the stator core 12 are mounted on the above-described conveying tray 65, the rotor core 11 and the stator core 12 are held from a direction of lamination by using a set of an upper die (a pressing die) 69 and a lower die (a resin injection die) 70. Thus, the rotor core 11 and the stator core 12 are pressed (clamped) at the same time.

The upper die 69 has the same structure as that of the above-described upper die 27. The lower die 70 has a structure substantially the same as that of the above-described lower die 28. The lower die 70 will be described below.

In the lower die 70, are provided resin reservoir pots 71 in which the tablet shaped resin 16 is charged and plungers 72 which can be lifted and lowered upward and downward in the resin reservoir pots 71.

The resin reservoir pots 71 include a rotor-dedicated pot 73 used solely for the rotor and a stator-dedicated pot 74 used solely for the stator. The plungers 72 include a rotor-dedicated plunger 75 used solely for the rotor which extrudes the resin 16 in the rotor-dedicated pot 73 used solely for the rotor to the magnet-insert hole 15 and a stator-dedicated plunger 76 used solely for the stator which extrudes the resin stored in the stator-dedicated pot 74 used solely for the stator to the connection hole 18.

The tablet shaped resin 16 in the rotor-dedicated pot 73 and the stator-dedicated pot 74 can be heated to be molten (liquid) by heaters 30 provided in the lower die 70.

The rotor-dedicated plunger 75 can be lifted and lowered by a pressure (a thrust C) from a plunger unit 78 having a spring 77 which is provided in a lower part of the lower die 70. Further, the stator-dedicated plunger 76 can be also lifted and lowered by a pressure (a thrust D) from a plunger unit 80 having a spring 79 which is provided in a lower part of the lower die 70.

Thus, after the resin 16 in the rotor-dedicated pot 73 and the stator-dedicated pot 74 is respectively heated to become liquid, the resin 16 can be extruded individually by using the rotor-dedicated plunger 75 and the stator-dedicated plunger 76.

Accordingly, as the resin injected to the magnet-insert hole 15 and the connection hole 18, different kinds of resins may be used. For instance, a resin injected to the magnet-insert hole 15 is set as the resin 16, and a resin injected to the connection hole 18 is set as a resin having a bonding strength which includes ceramic powder or a non-magnetic material having an insulating property.

Further, an extruding pressure of the resin injected to the magnet-insert hole 15 and the connection hole 18 may be set to different pressures depending on, for instance, sectional areas of the magnet-insert hole 15 and the connection hole 18 or kinds of resins to be used. In such a way, optimum resin injection conditions may be set respectively for the rotor core 11 and the stator core 12.

Further, an injection time of the resin to the magnet-insert hole 15 and the connection hole 18 does not need to be set to the same time, but may be shifted, for instance, by about a few seconds.

Figure 4:
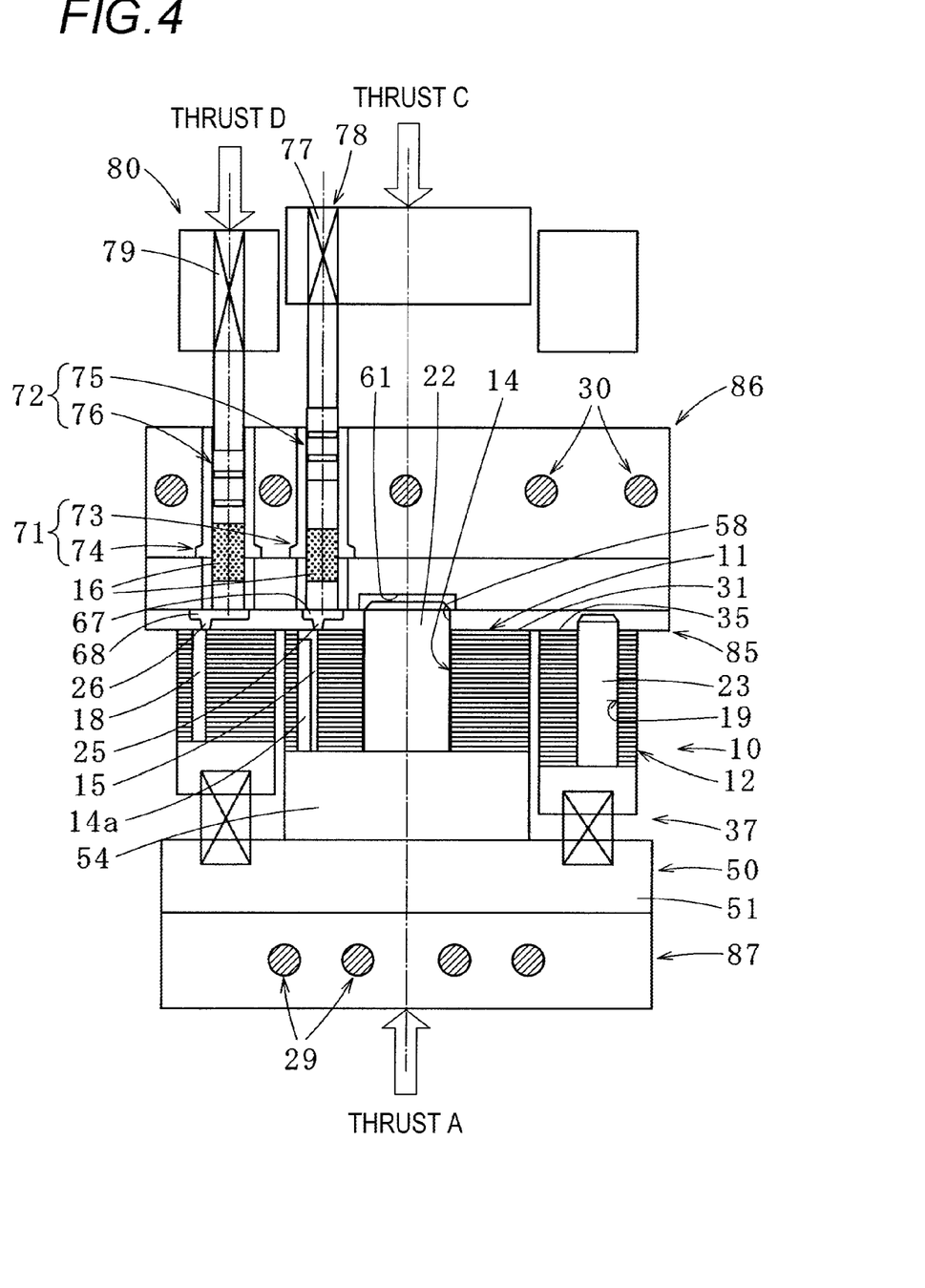
FIG. 4 is an explanatory view of a resin sealing method of a motor core according to a third modified example.

Subsequently, the method shown in FIG. 4 will be described below.

The above-described rotor core 11 and the stator core 12, namely, the motor core 10 is mounted on a metallic mount base 50. The mount base 50 is previously heated together with the rotor core 11 and the stator core 12 like the above-described conveying tray 20.

Then, a metallic cull plate 85 previously heated (preheated) to a resin injection temperature is arranged on surfaces of the rotor core 11 and the stator core 12 mounted on the mount base 50. At this time, an upper surface 31 of the rotor core 11 and an upper surface 35 of the stator core 12 are located at the same height by a pressure mitigating unit 37.

In the cull plate 85, are respectively formed two kinds of runners 67 and 68 which are opened toward an upper surface side and two kinds of gates 25 and 26 which respectively communicate with the runners 67 and 68 and are opened toward a lower surface side.

Thus, a resin 16 in the one runner 67 can be injected to a magnet-insert hole 15 through the gate 25. The resin 16 in the other runner 68 can be injected to a connection hole 18 through the gate 26.

The cull plate 85 is previously heated like the above-described conveying tray 20.

Then, in a state where the rotor core 11 and the stator core 12 are mounted on the above-described mount base 50 and the cull plate 85 is arrange on the surfaces of the rotor core 11 and the stator core 12, the rotor core 11 and the stator core 12 are held from a direction of lamination by using a set of an upper die (a resin injection die) 86 and a lower die (a pressing die) 87. Thus, the rotor core 11 and the stator core 12 are pressed (clamped) at the same time.

The upper die 86 has a structure substantially the same as a structure that the above-described lower die 70 is inverted in a vertical direction. The lower die 87 has the same structure as that of the above-described lower die 60. Specifically, in the upper die 86, a recessed part 61 is provided to which an end part of a post 22 can enter.

Thus, a pressing force (a thrust A, the same in the following) can be directly applied to the rotor core 11 from the lower die 87. Further, the pressing force from the lower die 87 can be applied to the stator core 12 through the pressure mitigating unit 37.

Further, after the resin 16 in a rotor-dedicated pot 73 used solely for the rotor and a stator-dedicated pot 74 used solely for the stator is respectively heated to become liquid, the resin 16 can be extruded individually by using a rotor-dedicated plunger 75 used solely for the rotor and a stator-dedicated plunger 76 used solely for the stator.

Figure 5:
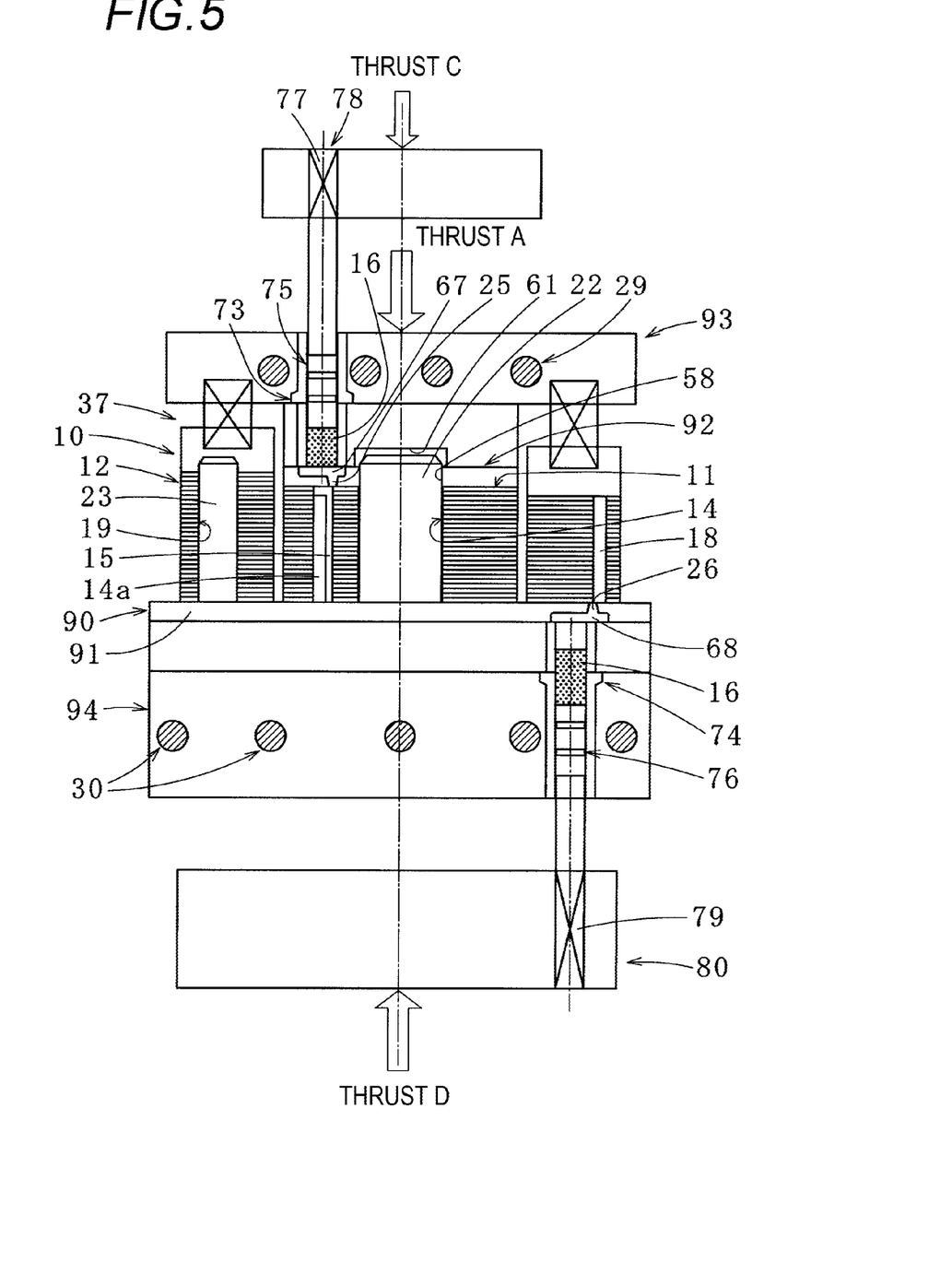
FIG. 5 is an explanatory view of a resin sealing method of a motor core according to a fourth modified example.

Finally, the method shown in FIG. 5 will be described below.

The above-described rotor core 11 and the stator core 12, namely, the motor core 10 are mounted on one metallic conveying tray (one example of an apparatus which is also referred to as a jig) 90.

The conveying tray 90 has a base plate 91 to mount the rotor core 11 and the stator core 12 on the base plate 91 with their axes aligned.

In the base plate 91 of the conveying tray 90, are respectively formed a runner 68 which is opened toward a lower surface side and a gate 26 which communicates with the runner 68 and is opened toward an upper surface side. Thus, a resin 16 in the runner 68 can be injected to a connection hole 18 through the gate 26.

The conveying tray 90 is previously heated together with the rotor core 11 and the stator core 12 like the above-described conveying tray 20.

Then, a metallic cull plate 92 previously heated (preheated) to a resin injection temperature is arranged on a surface of the rotor core 11 mounted on the conveying tray 90.

In the cull plate 92, are respectively formed a runner 67 which is opened toward an upper surface side and a gate 25 which communicates with the runner 67 and is opened toward a lower surface side. Thus, the resin 16 in the runner 67 can be injected to a magnet-insert hole 15 through the gate 25.

The cull plate 92 is previously heated like the above-described conveying tray 20.

Then, in a state where the rotor core 11 and the stator core 12 are mounted on the above-described conveying tray 90 and the cull plate 92 is arranged on the surface of the rotor core 11, the rotor core 11 and the stator core 12 are held from a direction of lamination by using a set of an upper die (a pressing die and a resin injection die for the rotor) 93 and a lower die (a resin injection die for the stator) 94. Thus, the rotor core 11 and the stator core 12 are pressed (clamped) at the same time.

The upper die 93 has a structure substantially the same as a structure that the above-described upper die 27 is combined with the upper die 86. The lower die 94 has a structure substantially the same as a structure that the above-described upper die 59 is inverted in a vertical direction.

In the upper die 93, are provided a rotor-dedicated pot 73 used solely for the rotor in which the tablet shaped resin 16 is charged and a rotor-dedicated plunger 75 used solely for the rotor which can be lifted and lowered in a vertical direction in the rotor-dedicated pot 73. In the upper die 93, a recessed part 61 is provided to which an end part of a post 22 can enter.

Further, in the lower die 94, are provided a stator-dedicated pot 74 used solely for the stator in which the tablet shaped resin 16 is charged and a stator-dedicated plunger 76 used solely for the stator which can be lifted and lowered in a vertical direction in the stator-dedicated pot 74.

The upper die 93 and the lower die 94 may be used in such a manner that the positions of the upper die 93 and the lower die 94 are inverted in the vertical direction.

Thus, a pressing force (a thrust A, the same in the following) can be directly applied to the rotor core 11 from the upper die 93. Further, the pressing force from the upper die 93 can be applied to the stator core 12 through a pressure mitigating unit 37.

Further, after the resin 16 in the rotor-dedicated pot 73 and the stator-dedicated pot 74 is respectively heated to become liquid, the resin 16 can be extruded individually by using the rotor-dedicated plunger 75 and the stator-dedicated plunger 76 used solely for the stator. In such a way, when the rotor-dedicated plunger 75 and the stator-dedicated plunger 76 are provided in opposed sides to each other, operating mechanisms of the plungers respectively do not interfere with each other, so that a degree of freedom in a design of the apparatus can be improved.

As stated above, the present invention is described by referring to the above-described exemplary embodiment, the present invention is not limited to the structures described in the exemplary embodiment and includes other exemplary embodiments or modified examples which may be considered within a range of subject matters of the present invention. For instance, a case may be included in the scope of the right of the present invention that a part or all of the above-described exemplary embodiment or the modified examples may be combined together to form the resin sealing method of the motor core and the apparatus used for the resin sealing method of the motor core of the present invention.

In the above-described exemplary embodiment, is explained a case that the resin sealing method of the motor core of the present invention is applied to an inner rotor type motor core in which a rotor core is arranged with a gap provided inside a stator core. However, it is to be understood that the present invention may be applied to an outer rotor type motor core in which a rotor core is arranged with a gap provided outside a stator core.

Further, in the above-described exemplary embodiment, is explained a case that when the motor core is mounted on the lower die, various kinds of apparatuses such as the conveying tray or the mount base are used. However, the motor core may be directly mounted on the lower die without using the above-described apparatuses.

In the above-described exemplary embodiment, a case is explained that the pressure mitigating unit includes the spring and the pressing part used solely for the stator. However, when the pressing force to the stator core can be made to be smaller (the pressing force can be absorbed) than the pressing force to the rotor core, the pressure mitigating unit may be formed with an elastic member such as rubber or a resin.

Further, in the above-described exemplary embodiment, a case is explained that the pressing force to the stator core is made to be smaller than the pressing force to the rotor core; however, the pressing force can be adjusted so as to be larger than the pressing force to the rotor core. At this time, a thrust by an apparatus may be directly applied to the stator core and the rotor core respectively without using the spring to apply different pressing forces to the stator core and the rotor core.

What is claimed is:

1. A resin sealing method of a motor core having a rotor core and a stator core formed in such a way that a plurality of iron core pieces is laminated, the resin sealing method comprising:
   pressing the rotor core and the stator core from a direction of lamination by using a set of an upper die and a lower die; then
   extruding a resin stored in a resin reservoir pot provided in one or both of the upper die and the lower die by using a plunger; and
   allowing a magnet-insert hole formed in the direction of lamination of the rotor core and a connection hole formed in the direction of lamination of the stator core to be filled with the resin and harden the resin.

2. The resin sealing method according to claim 1, wherein when the resin reservoir pot is provided in one of the upper die and the lower die, the plunger is shared to extrude the resin stored in the resin reservoir pot to the magnet-insert hole and the connection hole.

3. The resin sealing method according to claim 1, wherein when the resin reservoir pot includes a rotor-dedicated pot used solely for a rotor and a stator-dedicated pot used solely for a stator and the plunger includes a rotor-dedicated plunger used solely for the rotor which extrudes the resin stored in the rotor-dedicated pot to the magnet-insert hole and a stator-dedicated plunger used solely for the stator which extrudes the resin stored in the stator-dedicated pot to the connection hole, the resin stored in the rotor-dedicated pot and the resin stored in the stator-dedicated pot are respectively extruded individually by using the rotor-dedicated plunger and the stator-dedicated plunger.

4. The resin sealing method according to claim 1, wherein the upper die or the lower die provided with a pressure mitigating unit is allowed to directly come into contact with the rotor core so as to apply a pressing force to the rotor core and the pressure mitigating unit is allowed to come into contact with the stator core so as to apply a pressing force to the stator core.

5. The resin sealing method according to claim 4, wherein the rotor core and the stator core are pressed by different pressures, respectively.

6. The resin sealing method according to claim 1, wherein the rotor core and the stator core are pressed by using the upper die and the lower die in a state where the rotor core and the stator core are mounted on one jig.

7. The resin sealing method according to claim 6, wherein the upper die or the jig provided with a pressure mitigating unit is allowed to directly come into contact with the rotor core so as to apply a pressing force to the rotor core and the pressure mitigating unit is allowed to come into contact with the stator core so as to apply a pressing force to the stator core.

8. The resin sealing method according to claim 6, wherein the rotor core and the stator core are pressed by different pressures, respectively.

\* \* \* \* \*